April 27, 1954  J. N. STRAUSS ET AL  2,676,614
FLUID PRESSURE CONTROL VALVE
Filed July 20, 1950
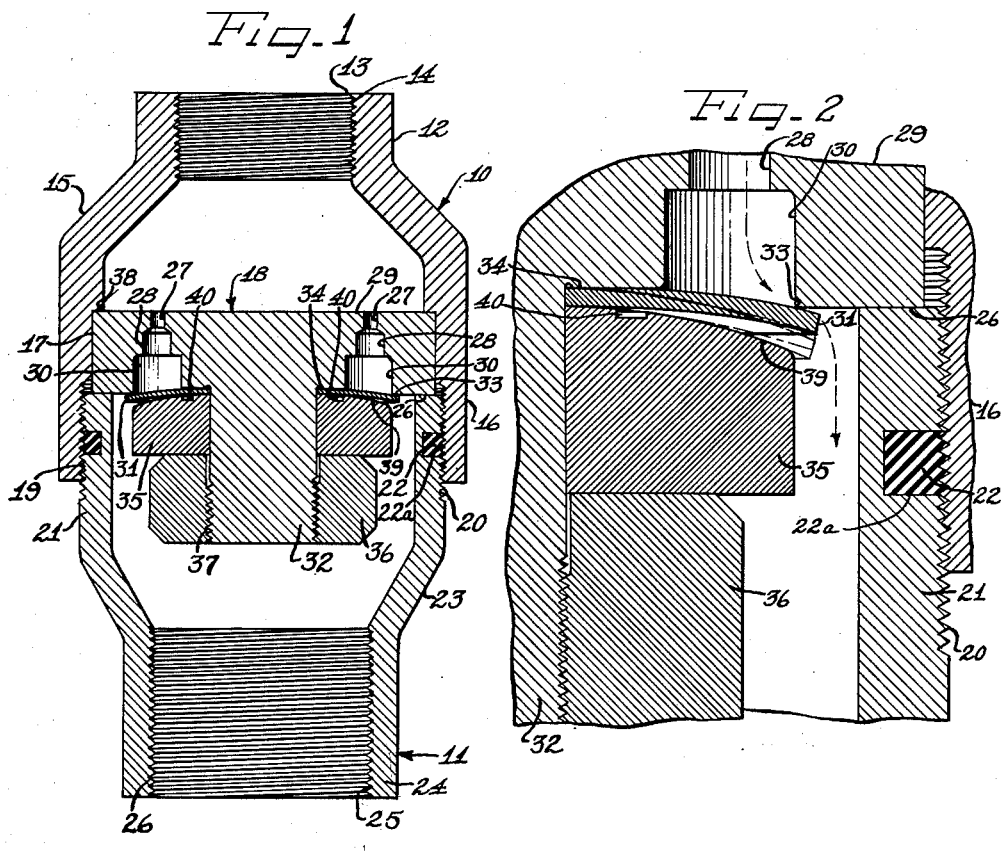
Inventors
John N. Strauss
Kenneth W. Cuffe
by The Firm of Charlesworth Hills Attys Patented Apr. 27, 1954

2,676,614

UNITED STATES PATENT OFFICE 2,676,614

FLUID PRESSURE CONTROL VALVE

John N. Strauss, Williamsville, and Kenneth W. Cuffe, Sanborn, N. Y., assignors to Houdaille-Hershey Corporation, Detroit, Mich., a corporation of Michigan Application July 20, 1950, Serial No. 174,952

4 Claims. (Cl. 137—516.19)

This invention relates in general to improvements in fluid pressure control and check valves.

An object of the present invention is to provide an improved, simplified, highly efficient throttle and check valve means for controlling fluid flow.

Another object of the present invention is to provide a fluid pressure control valve which is not only durable and dependable in service, but is also susceptible of unusually low cost manufacture so as to provide a competitively important commercial product.

A feature of the present invention is the use of a valve disk that deflects responsive to fluid pressure to increase the orifice flow area and simultaneously provides a deflectional resistance to oppose and throttle the flow through a fluid passage.

Another feature of the present invention is the use of a crown contour valve modifying surface that is progressively engageable by a resilient valve disk to progressively increase the deflectional tension of the valve disk as the valve disk is deflected. The crown contour surface further establishes a maximum possible stress for the valve disk, thereby avoiding the danger of permanent stress or fatigue of the valve disk structure.

Other objects, features and advantages of the present invention will be readily apparent from the following detailed description of a preferred embodiment thereof taken in conjunction with the accompanying drawings, in which:

Figure 1 is a vertical sectional view of a fluid pressure control valve assembly embodying the features of the present invention.

Figure 2 is an enlarged fragmentary vertical sectional view particularly showing the structure of the valve disk and its relation to the crown contour surface.

The fluid pressure control valve assembly, as shown in Figure 1, comprises a two-piece casing. Forming the two-piece casing is an upstream coupling member 10 and a complementary downstream coupling member 11.

The cap member 10 comprises a cylindrical coupling receiving section 12 having a bore 13 therethrough formed with internal threads 14, thus enabling a pipe or other fluid directing or conducting means to be connected thereto.

Extending from the cylindrical coupling section 12 is a flaring intermediate section 15 to provide enlargement of fluid flow passage through the member 10. Extending from the section 15 is an enlarged cylindrical section 16 wherein is provided an internal annular rabbet groove 17. Fitted within the annular rabbet groove 17 is a body member 18 to be described in detail hereinafter. The lowermost portion of the enlarged section 16 is provided with an internally threaded portion 19 which is threadedly engageable with external threads 20 on a telescoped cylindrical section 21 of the coupling member 11, to join the coupling members.

At the interfaces of the coupling sections 16 and 21 are provided sealing means, such as a sealing ring 22 seated in a groove 22a in the section 21, to prevent leakage through the threaded portions. The sealing ring 22 is made of a suitable resilient material, such as rubber.

Extending from the vertical section 21 of the coupling member 11 is a tapering intermediate section 23 to provide a decrease in cross-sectional area of the fluid flow passage of the coupling member 11.

A terminal cylindrical section 24 of the coupling member 11 extends from the section 23 to provide a fluid outlet for the fluid pressure control valve assembly. A bore 25 is provided therethrough having internal threads 26 for connection to fluid receiving means such as a pipeline.

The body member 18 is of appropriate circular, generally disk-like shape and provides a support for valve deflecting means and a stressing member to be described hereinafter. The body member 18 is driven into retained relation in the groove 17 by a clamping shoulder 26 at the end of the vertical section 21. The axial cross-section of the body member 18 is preferably substantially T-shaped.

To permit and control to some extent downstream flow, one or a plurality of fluid passages provided by ports or orifices 27 extended from the upstream face of the body member 18 into a cylindrical disk section 29 adjacent the margin of the body member. Counterbore enlargements 28 at the downstream ends of the orifice 27 extend into an annular channel 30 opening from the downstream face of the body 18.

In order further to control the downstream fluid flow and to check reverse flow, a valve disk 31 in the form of a centrally apertured resilient plate is provided and maintained in centered relation about a reduced diameter portion or stem 32 of the body member 18 and bearing at its outer margin against a seating shoulder or edge 33 at the juncture of the downstream face of the body member 18 and the radially outer edge of the channel 30. At its inner margin, the valve disk 31 bears against a shoulder 34 radially inwardly of the channel 30 adjacent the reduced diameter portion 32, and inset from the seating edge abutment 33. The valve disk 31 may be formed as a stamping from appropriate quality spring steel or other spring material of appropriate gauge and which prior to assembly in the valve is preferably flat. If desired, a plurality of valve disks 31 may be used in a laminated relation in the valve.

In the assembly, the valve disk 31 is maintained under spring tension by stressing the same against the inset body shoulder 34 by means of a stressing plate or ring 35 which encircles the reduced diameter portion 32 of the body member 18 and is driven upwardly against the radially inner portion of the disk 31 by means of a nut threaded onto the threaded extremity portion 37 of the reduced diameter stem 32.

The pre-stressed disk valve affords substantial initial resistance to fluid displacement determined by the weight of the disk valve 31 and its preloaded stress. It will thus be apparent that by a proper correlation of the orifice flow area provided by the orifices 27 and proper selection of the resiliency or thickness of the valve disk and the pre-stress of the disk structure, various predetermined service requirements can be anticipated in production.

Means are provided for progressively increasing the flow resistance rate or stress of the disk valve 31 as it is deflected. Herein such means comprise a symmetrically curved crown contour 39 on the valve stressing plate or ring 35. Hence, by having the crown contour 39 so related to the opposing surface of the valve disk 31 that in the closed condition of the valve the surface thereof is spaced from the crown contour 39 progressively from the inner margin radially outward, there is a resulting progressive engagement by the opposing surface of the valve disk structure with the crown contour on the radially inner portion of the contour toward the outer periphery as the valve disk 31 is deflected by the fluid as indicated in Figure 2. As deflection of the valve disk 31 increases, the resistance to deflection increases progressively as the area of the disk structure progressively engages against the crown contour of the stressing member 35. This effects a progressive force-velocity build-up that has a throttling effect on fluid flow increasing proportionately to the point of full deflection of the valve disk 31, which is attained and limited by the full engagement of the disk valve 31 against the crown contour 39, indicated by the lowermost dash line position in Figure 2. Thus, by appropriate contouring of the crown surface 39 according to predetermined specifications, this valve control relationship can be attained to meet various service requirements.

It is to be noted that as the deflection of the valve disk increases, the fulcrum point of the lever arrangement provided by the valve disk 31 and the ring 35 shifts radially outward from the shoulder 34. Under no fluid pressure condition or at least less fluid pressure than will unseat the valve disk, the fulcrum point is at the shoulder 34 and the valve disk seats sealingly against the seat shoulder 33. As the valve disk deflects progressively because of increasing fluid pressure, the fulcrum point shifts progressively to a point on the contour surface 39 outward from the shoulder 34 and thus the increased resistance to the fluid flow is provided by the valve disk 31 opposed by the ring 35.

To provide for a limited gap in the progressive and tensioning action of the contoured surface 39, an annular groove 40 is provided suitably located in the contour surface 39 adjacent to the shoulder 34 whereby the fulcrum point remains constant at the radially inward edge defining the gap until the deflecting member or valve disk 31 engages the offset radially outward edge defining the groove 40. This position of the valve disk is indicated by the intermediate dash outline position of the valve disk in Figure 2. As a result, the groove 40 provides a gap in the progressive engagement of the valve disk 33 whereby the deflectional tension of the valve disk is unmodified by the stressing member for the distance of the gap width. It is to be noted further that the aperture for fluid flow from the channel 30 increases as the deflection of the valve disk 31 increases.

A further advantage of the progressively increasing contact diameter between the crown contour 39 and the valve disk 31 resides in that the point of maximum stress of the valve disk structure travels over a substantial radial area of the disk structure during operation and thus avoids the danger of permanent stress or fatigue of the disk structure and greatly prolongs the useful life of the disk structure.

It will thus be apparent that although the fluid control valve comprises only a few simple parts, a wide range of operating and service conditions can be provided for by simple predetermined dimensional variations and relationships of certain elements. Thus, fluid control can be predetermined for any given working requirements by the correlated proportions and dimensions of the orifices 27, the valve disk 31, the crown contour 39 and the pre-stress of the disk structure 31. All of the parts of the valve assembly can be made by simple mass production methods of manufacture as stampings or molded or machined parts or castings.

It will be understood that modifications and variations may be effected without departing from the scope of the novel concepts of the present invention.

We claim as our invention:

1. In a fluid pressure valve, a member having a fluid passage therethrough, a valve disk for checking flow through said passage in one direction, said member providing a seat for said valve disk, means engaging the central portion of the valve disk for normally maintaining the valve disk in flow checking relation on said seat, the valve disk being annularly resiliently deflectable entirely around said engaging means to move from its seat by fluid pressure created by flow in the opposite direction through said passage, a symmetrically contoured surface annularly opposing the valve disk in normally progressively spaced relation concentrically about said engaging means, but being progressively engageable in the radial direction by the valve disk to progressively increase the deflectional tension of the valve disk as the disk is deflected from said seat by fluid pressure flowing in said opposite direction, and said contoured surface having an annular groove therein to provide an area to provide a gap in the progressive engagement of said valve disk whereby the deflectional tension remains constant throughout the width of said gap.

2. In a fluid pressure valve, a body having fluid passage therethrough for displacement of fluid in one direction, a centrally apertured valve disk checking flow of fluid in the opposite direction through said passage, said valve disk being secured against movement uniformly annularly on one margin and being deflectable toward its opposite margin for opening said passage in response to fluid pressure through said passage against the valve disk, and means for limiting the deflectional opening movement of the valve disk, said means comprising an abutment having a symmetrically curved annular contoured crown concentric with the central aperture in the disk and opposing the face of the disk opposite the face against which fluid pressure is exerted from said passage and normally lying in progressively spaced relation to said face in a radial sense but uniformly in each annular increment of the crown, said crown being progressively engageable by the valve disk as the valve disk is forced open by fluid pressure to progressively increase the deflectional resistance of the valve disk, said contour crown having an annular groove therein to provide a gap in the progressive engagement of said valve disk whereby the deflectional tension remains substantially constant over said gap.

3. In a fluid pressure valve, tubular means defining a fluid chamber, a body member supported in fully traversing relation within said tubular means and having a fluid passage therethrough, a valve disk disposed concentrically relative to said member for checking flow through said passage in one direction, said member providing an annular seat for said valve disk, means normally maintaining the valve disk in pre-stressed flow checking relation on said seat, the valve disk being deflectable from its seat by fluid pressure created by flow in the opposite direction through said passage, a ring concentric with said valve seat having an annular contoured surface opposing the valve disk but being progressively engaged by the valve disk to progressively increase the deflectional tension of the valve disk as the disk is deflected from said seat by fluid pressure flowing in the opposite direction, and said contoured surface having an annular concentric groove therein to provide a gap in the progressive engagement of said valve disk whereby the deflectional tension remains constant throughout the width of said gap.

4. In a fluid pressure valve, a member having a fluid passage therethrough, a valve disk for checking flow through said passage in one direction, said member providing a seat for said valve disk, means engaging the central portion of the valve disk for normally maintaining the valve disk in flow checking relation on said seat, the valve disk being annularly resiliently deflectable entirely around said engaging means to move from its seat by fluid pressure created by flow in the opposite direction through said passage, a symmetrically contoured surface annularly opposing the valve disk in normally progressively spaced relation concentrically about said engaging means and being progressively engageable in the radial direction by the valve disk to progressively increase the deflectional tension of the valve disk as the disk is deflected from said seat by fluid pressure flowing in said opposite direction, and an annular portion at the radially inner margin of said contoured surface slightly offset relative to said surface and affording a limited gap in the initial engagement of the valve disk with the contoured surface.

References Cited in the file of this patent

UNITED STATES PATENTS

| Number | Name | Date |
|---|---|---|
| 1,184,998 | Reardon | May 30, 1916 |
| 1,408,724 | Decrow | Mar. 7, 1922 |
| 1,614,124 | Hansen | Jan. 11, 1927 |
| 1,634,949 | Le Valley | July 5, 1927 |
| 1,659,343 | Whitehead | Feb. 14, 1928 |
| 2,151,746 | Cody | Mar. 28, 1939 |
| 2,547,377 | Juhasz | Apr. 3, 1951 |

FOREIGN PATENTS

| Number | Country | Date |
|---|---|---|
| 512,632 | Great Britain | 1939 |